US012124886B2

(12) United States Patent
Ni et al.

(10) Patent No.: US 12,124,886 B2
(45) Date of Patent: Oct. 22, 2024

(54) DATA PROCESSING METHOD AND APPARATUS, AND COMPUTING DEVICE

(71) Applicant: HUAWEI TECHNOLOGIES CO., LTD., Guangdong (CN)

(72) Inventors: Xiaoke Ni, Shenzhen (CN); Jinpeng Chen, Shenzhen (CN); Hao Lan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 668 days.

(21) Appl. No.: 17/232,195

(22) Filed: Apr. 16, 2021

(65) Prior Publication Data
US 2021/0232437 A1    Jul. 29, 2021

Related U.S. Application Data

(63) Continuation of application No. PCT/CN2019/094203, filed on Jul. 1, 2019.

(30) Foreign Application Priority Data

Oct. 19, 2018    (CN) .......................... 201811223591.3

(51) Int. Cl.
G06F 9/50    (2006.01)
G06F 13/28   (2006.01)

(52) U.S. Cl.
CPC .......... G06F 9/5077 (2013.01); G06F 9/5011 (2013.01); G06F 9/5072 (2013.01); G06F 13/28 (2013.01); G06F 2209/5011 (2013.01)

(58) Field of Classification Search
CPC ...... G06F 9/5077; G06F 9/5011; G06F 13/28; G06F 9/5027; G06F 9/5072; G06F 9/547; H04L 67/34
See application file for complete search history.

(56) References Cited

U.S. PATENT DOCUMENTS 8,549,098 B2 * 10/2013 Aloni ..................... H04L 49/90
                                                           709/219
10,230,544 B1 * 3/2019 McDowell .......... H04L 12/4645
(Continued)

FOREIGN PATENT DOCUMENTS

CN    104077265 A    10/2014
CN    104410666 A     3/2015
(Continued)

OTHER PUBLICATIONS

Office Action issued in CN 201811223591.3, dated Feb. 28, 2020, 6 pages.
(Continued)

Primary Examiner — Brian W Wathen

(57) ABSTRACT

This disclosure provides a data processing method, including: receiving, by a first computing device, a first packet sent by a second computing device, where the first computing device is configured to assist the second computing device in performing service processing, the first computing device is a computing device in a heterogeneous resource pool, the first computing device communicates with the second computing device through a network, the heterogeneous resource pool includes at least one first computing device, and the first packet includes an instruction used to request the first computing device to process to-be-processed data; processing, by the first computing device, the to-be-processed data based on the instruction; and sending, by the first computing device, a second packet to the second computing device, where the second packet includes a processing result of the to-be-processed data.

20 Claims, 4 Drawing Sheets

(56) References Cited

U.S. PATENT DOCUMENTS

| | | | | |
|---|---|---|---|---|
| 2011/0255540 | A1* | 10/2011 | Mizrahi | H04L 45/74 |
| | | | | 370/392 |
| 2013/0152076 | A1 | 6/2013 | Patel | |
| 2014/0180905 | A1* | 6/2014 | Parsons | H04L 45/72 |
| | | | | 705/37 |
| 2016/0352597 | A1* | 12/2016 | Mekkattuparamban | |
| | | | | H04W 76/34 |
| 2017/0250912 | A1* | 8/2017 | Chu | H04L 45/7453 |
| 2018/0139150 | A1* | 5/2018 | Jain | H04L 41/0896 |
| 2018/0191623 | A1* | 7/2018 | Marty | G06F 15/167 |
| 2018/0293776 | A1 | 10/2018 | Joydeep et al. | |

FOREIGN PATENT DOCUMENTS

| | | |
|---|---|---|
| CN | 104778148 A | 7/2015 |
| CN | 106294214 A | 1/2017 |
| CN | 107181825 A | 9/2017 |
| CN | 107292808 A | 10/2017 |
| CN | 107977922 A | 5/2018 |
| CN | 109547531 A | 3/2019 |
| EP | 3706394 A1 | 9/2020 |
| WO | 2019014265 A1 | 1/2019 |

OTHER PUBLICATIONS

International Search Report and Written Opinion issued in PCT/CN2019/094203, dated Sep. 20, 2019, 10 pages.
Jagath Weerasinghe: "Standalone Disaggregated Reconfigurable Computing Platforms in Cloud Data Centers", May 24, 2018 (May 24, 2018), XP055699373,total 182 pages.
Extended European Search Report issued in EP19873706.6, dated Oct. 12, 2021, 8 pages.

* cited by examiner

DATA PROCESSING METHOD AND APPARATUS, AND COMPUTING DEVICE

CROSS-REFERENCE TO RELATED APPLICATIONS

This is a continuation of International Application No. PCT/CN2019/094203, filed on Jul. 1, 2019, which claims priority to Chinese Patent Application No. 201811223591.3, filed on Oct. 19, 2018. The disclosures of the aforementioned applications are hereby incorporated by reference in their entireties.

TECHNICAL FIELD

The present disclosure relates to the field of information technologies, and in particular, to a data processing method and apparatus, and a computing device.

BACKGROUND

With development of the server field, compared with a common server configured with only a central processing unit (CPU), a heterogeneous server emerges. The heterogeneous server refers to a same server that includes both a CPU and other heterogeneous resources. The heterogeneous resources include a graphics processing unit (GPU), a field programmable gate array (FPGA), an application-specific integrated circuit (ASIC), and a neural processing unit (NPU).

The heterogeneous server is usually used to assist a common server or a virtual machine running on a common server in data processing. Each heterogeneous resource is usually exclusively occupied by one common server or one virtual machine (VM). For example, a specific heterogeneous resource is usually bound to a specific server or a specific VM, and is only used to process an instruction of the server or the virtual machine. Different types of application programs run on a virtual machine or a server. In a communication process between the virtual machine and a heterogeneous resource, or in a communication process between the server and a heterogeneous resource, heavy network traffic is generated. Consequently, communication between the virtual machine or the server and the heterogeneous server becomes a bottleneck, and data processing speed and data processing efficiency between a common computing device and a heterogeneous computing device are affected.

SUMMARY

The present disclosure provides a data processing method, and the method can improve communication performance between a server or a virtual machine and a heterogeneous server.

According to a first aspect, an embodiment of a data processing method is provided, including: A first computing device receives a first packet sent by a second computing device, where the first computing device is configured to assist the second computing device in performing service processing, the first computing device is a computing device in a heterogeneous resource pool, the first computing device communicates with the second computing device through a network, the heterogeneous resource pool includes at least one first computing device, and the first packet includes an instruction used to request the first computing device to process to-be-processed data. The first computing device processes the to-be-processed data based on the instruction, and sends a second packet to the second computing device, where the second packet includes a processing result of the to-be-processed data.

The heterogeneous resource pool includes a plurality of computing devices (for example, a plurality of first computing devices), so that when a plurality of second computing devices simultaneously need heterogeneous resources to assist the plurality of second computing devices in executing service requests, the requests of the plurality of second computing devices may be distributed to different computing devices in the heterogeneous resource pool. In this case, the plurality of first computing devices in the heterogeneous resource pool can assist the plurality of second computing devices in executing the corresponding service requests. Therefore, network traffic generated during communication between the second computing device and the heterogeneous resource is distributed to different computing devices in the heterogeneous resource pool, so that communication performance between the second computing device and the heterogeneous resource is improved.

In an example embodiment, the first packet that is sent by the second computing device and that is received by the first computing device includes the to-be-processed data. The first computing device parses the received first packet to obtain the to-be-processed data, and processes the to-be-processed data based on the instruction carried in the first packet.

When transmission of the to-be-processed data does not affect communication performance between the first computing device and the second computing device, the second computing device may directly send, to the first computing device, the first packet carrying the to-be-processed data. This reduces a communication latency between the first computing device and the second computing device.

In another example embodiment, the second computing device configures a first storage resource in a storage device, and the first computing device has access permission of the first storage resource. The second computing device may send, only to the first computing device, the first packet carrying a first target address, where the first target address is used to indicate a storage address of the to-be-processed data in the first storage resource. The first storage resource is a storage resource that is configured for the second computing device and that has the access permission, and the first computing device obtains the first target address from the first packet based on the received first packet, to obtain the to-be-processed data from storage space corresponding to the first target address in the first storage resource.

When a transmission process of the to-be-processed data affects communication performance between the first computing device and the second computing device, the second computing device may store the to-be-processed data in the storage space corresponding to the first target address in the first storage resource, and add the first target address to the first packet sent to the first computing device. In this way, the first computing device obtains the to-be-processed data from the storage space corresponding to the first target address in the first storage resource. This avoids direct sending of the to-be-processed data to the first computing device, thereby improving the communication performance between the first computing device and the second computing device.

In another example embodiment, after obtaining the processing result of the to-be-processed data, the first computing device may send the second packet to the second computing device, where the second packet includes the processing result of the to-be-processed data.

In another example embodiment, after obtaining the processing result of the to-be-processed data, the first computing device may store the processing result of the to-be-processed data in storage space corresponding to a second target address in a first storage resource, add the second target address to the second packet, and send the second packet to the second computing device. The second computing device obtains the second target address from the second packet based on the received second packet, to obtain the processing result of the to-be-processed data from the storage space corresponding to the second target address in the first storage resource.

When a transmission process of the processing result of the to-be-processed data may affect communication performance between the first computing device and the second computing device, the first computing device may store the to-be-processed data in the storage space corresponding to the second target address in the first storage resource, and add the second target address to the second packet sent to the second computing device. In this way, the second computing device obtains the processing result of the to-be-processed data from the storage space corresponding to the second target address in the first storage resource. This avoids direct sending of the processing result of the to-be-processed data to the second computing device, thereby improving the communication performance between the first computing device and the second computing device.

In another example embodiment, when the to-be-processed data is video bitstream data, the first computing device first needs to decode the video bitstream data to obtain image data corresponding to the video bitstream data when processing the video bitstream data. Then, the first computing device processes the image data corresponding to the video bitstream data to obtain the processing result of the to-be-processed data corresponding to the video bitstream data.

In another example embodiment, when the to-be-processed data is video bitstream data, the processing result of the to-be-processed data returned by the first computing device to the second computing device should further include image data corresponding to the video bitstream data obtained after the video bitstream data is decoded.

In another example embodiment, when the processing result of the to-be-processed data is directly sent by the first computing device to the second computing device, the processing result of the to-be-processed data may be sent by the first computing device to the second computing device in a remote direct memory access (RDMA) manner.

In another example embodiment, when the to-be-processed data is directly sent by the second computing device to the first computing device, the to-be-processed data may be sent by the second computing device to the first computing device in an RDMA manner.

In another example embodiment, the storage device configured with the first storage resource includes a file system storage device, a distributed file system storage device, a block storage device, or an object storage device.

In another example embodiment, processing corresponding to the instruction includes artificial intelligence (AI) processing.

According to a second aspect, an example data processing method is provided, including: A second computing device sends a first packet to a first computing device, where the first computing device is configured to assist the second computing device in performing service processing, the first computing device is a computing device in a heterogeneous resource pool, the first computing device communicates with the second computing device through a network, the heterogeneous resource pool includes at least one first computing device, and the first packet includes an instruction used to request the first computing device to process to-be-processed data. The first computing device processes the to-be-processed data based on the instruction, and sends a second packet to the second computing device, where the second packet includes a processing result of the to-be-processed data. The second computing device receives the second packet sent by the first computing device, where the second packet includes the processing result of the to-be-processed data.

The heterogeneous resource pool includes a plurality of computing devices (for example, a plurality of first computing devices), so that when a plurality of second computing devices simultaneously need heterogeneous resources to assist the plurality of second computing devices in performing service processing, demands of the plurality of second computing devices requesting to be assisted in performing service requests may be distributed to different computing devices in the heterogeneous resource pool. In this case, the plurality of first computing devices in the heterogeneous resource pool can assist the plurality of second computing devices in performing the corresponding service processing. Therefore, network traffic generated during communication between the second computing device and the heterogeneous resource is distributed to different computing devices in the heterogeneous resource pool, so that communication performance between the second computing device and the heterogeneous resource is improved.

In an example embodiment, the first packet that is sent by the second computing device to the first computing device includes the to-be-processed data. The first computing device parses the received first packet to obtain the to-be-processed data, and processes the to-be-processed data based on the instruction carried in the first packet.

When transmission of the to-be-processed data does not affect communication performance between the first computing device and the second computing device, the second computing device may directly send, to the first computing device, the first packet carrying the to-be-processed data. This reduces a communication latency between the first computing device and the second computing device.

In another example embodiment, the second computing device configures a first storage resource in a storage device, and the first computing device has access permission of the first storage resource. The second computing device adds a first target address to the first packet, where the first target address is used to indicate a storage address of the to-be-processed data in the first storage resource. The first storage resource is a storage resource that is configured for the second computing device and that has access permission, and the first computing device obtains the first target address from the first packet based on the received first packet, to obtain the to-be-processed data from storage space corresponding to the first target address in the first storage resource.

When transmission of the to-be-processed data affects communication performance between the first computing device and the second computing device, the second computing device may store the to-be-processed data in the storage space corresponding to the first target address in the first storage resource, and add the first target address to the first packet sent to the first computing device. In this way, the first computing device obtains the to-be-processed data from the storage space corresponding to the first target address in the first storage resource. This avoids direct sending of the to-be-processed data to the first computing device, thereby improving the communication performance between the first computing device and the second computing device.

In another example embodiment, the second packet that is sent by the first computing device and that is received by the second computing device includes the processing result of the to-be-processed data.

When transmission of the processing result of the to-be-processed data does not affect communication performance between the first computing device and the second computing device, the first computing device may directly send, to the second computing device, the second packet carrying the processing result of the to-be-processed data. This reduces a communication latency between the first computing device and the second computing device.

In another example embodiment, after obtaining the processing result of the to-be-processed data, the first computing device may store the processing result of the to-be-processed data in storage space corresponding to a second target address in a first storage resource, add the second target address to the second packet, and send the second packet to the second computing device. The second computing device obtains the second target address from the second packet based on the received second packet, to obtain the processing result of the to-be-processed data from the storage space corresponding to the second target address in the first storage resource.

When transmission of the processing result of the to-be-processed data may affect communication performance between the first computing device and the second computing device, the first computing device may store the to-be-processed data in the storage space corresponding to the second target address in the first storage resource, and add the second target address to the second packet sent to the second computing device. In this way, the second computing device obtains the processing result of the to-be-processed data from the storage space corresponding to the second target address in the first storage resource. This avoids direct sending of the processing result of the to-be-processed data to the second computing device, thereby improving the communication performance between the first computing device and the second computing device.

In another example embodiment, when the to-be-processed data is video bitstream data, the first computing device first needs to decode the video bitstream data to obtain image data corresponding to the video bitstream data when processing the video bitstream data. Then, the first computing device processes the image data corresponding to the video bitstream data to obtain the processing result of the to-be-processed data corresponding to the video bitstream data.

In another example embodiment, when the to-be-processed data is video bitstream data, the processing result of the to-be-processed data returned by the first computing device to the second computing device should further include image data corresponding to the video bitstream data obtained after the video bitstream data is decoded.

In another example embodiment, when the processing result of the to-be-processed data is directly sent by the first computing device to the second computing device, the processing result of the to-be-processed data may be sent by the first computing device to the second computing device in a remote direct memory access (RDMA) manner.

In another example embodiment, when the to-be-processed data is directly sent by the second computing device to the first computing device, the to-be-processed data may be sent by the second computing device to the first computing device in an RDMA manner.

In another example embodiment, the storage device configured with the first storage resource includes a file system storage device, a distributed file system storage device, a block storage device, or an object storage device.

In another example embodiment, processing corresponding to the instruction includes artificial intelligence (AI) processing.

According to a third aspect, an example data processing apparatus is provided. The apparatus is configured to perform the method in any one of the first aspect or the example embodiments of the first aspect. Specifically, the apparatus may include units configured to perform the data processing method in any one of the first aspect or the example embodiments of the first aspect.

According to a fourth aspect, an example data processing apparatus is provided. The apparatus is configured to perform the method in any one of the second aspect or the example embodiments of the second aspect. Specifically, the apparatus may include units configured to perform the data processing method in any one of the second aspect or the example embodiments of the second aspect.

According to a fifth aspect, an example computing device is provided. The device includes a memory, a heterogeneous resource, and a processor. The memory is configured to store a program, and the processor is configured to: execute the program stored in the memory, and schedule the heterogeneous resource to perform the data processing method in any one of the first aspect or the example embodiments of the first aspect.

According to a sixth aspect, an example computing device is provided. The device includes a memory and a processor. The memory is configured to store one or more instructions, and the processor executes the one or more instructions stored in the memory, so that the device performs the data processing method in any one of the second aspect or the example embodiments of the second aspect.

According to a seventh aspect, an example computer-readable storage medium is provided. The computer-readable storage medium stores one or more instructions, and when the one or more instructions are run on a computer, the computer is enabled to perform the data processing method in any one of the first aspect or the example embodiments of the first aspect.

According to an eighth aspect, a computer-readable storage medium is provided. The computer-readable storage medium stores one or more instructions, and when the one or more instructions are run on a computer, the computer is enabled to perform the data processing method in any one of the second aspect or the example embodiments of the second aspect.

According to a ninth aspect, an example computer program product including one or more instructions are provided. When the one or more instructions are run on a computer, the computer is enabled to perform the data processing method in any one of the first aspect or the example embodiments of the first aspect.

According to a tenth aspect, an example computer program product including one or more instructions is provided. When the one or more instructions are run on a computer, the computer is enabled to perform the data processing method in any one of the second aspect or the example embodiments of the second aspect.

According to an eleventh aspect, an example computer system is provided, where the computer system includes a first computing device and a second computing device. The first computing device is configured to assist the second computing device in performing service processing, the first computing device is a computing device in a heterogeneous resource pool, the first computing device communicates with the second computing device through a network, and the heterogeneous resource pool includes at least one first computing device. The second computing device configures a first storage resource in a storage device, and the first computing device has access permission of the first storage resource. The first computing device is configured to perform the method in any one of the first aspect or the example embodiments of the first aspect, and the second computing device is configured to perform the method in any one of the second aspect or the example embodiments of the second aspect.

Based on the implementations provided in the foregoing aspects, this disclosure may further combine the implementations to provide more implementations.

DESCRIPTION OF EMBODIMENTS

The following describes technical solutions of this disclosure with reference to accompanying drawings.

Figure 1:
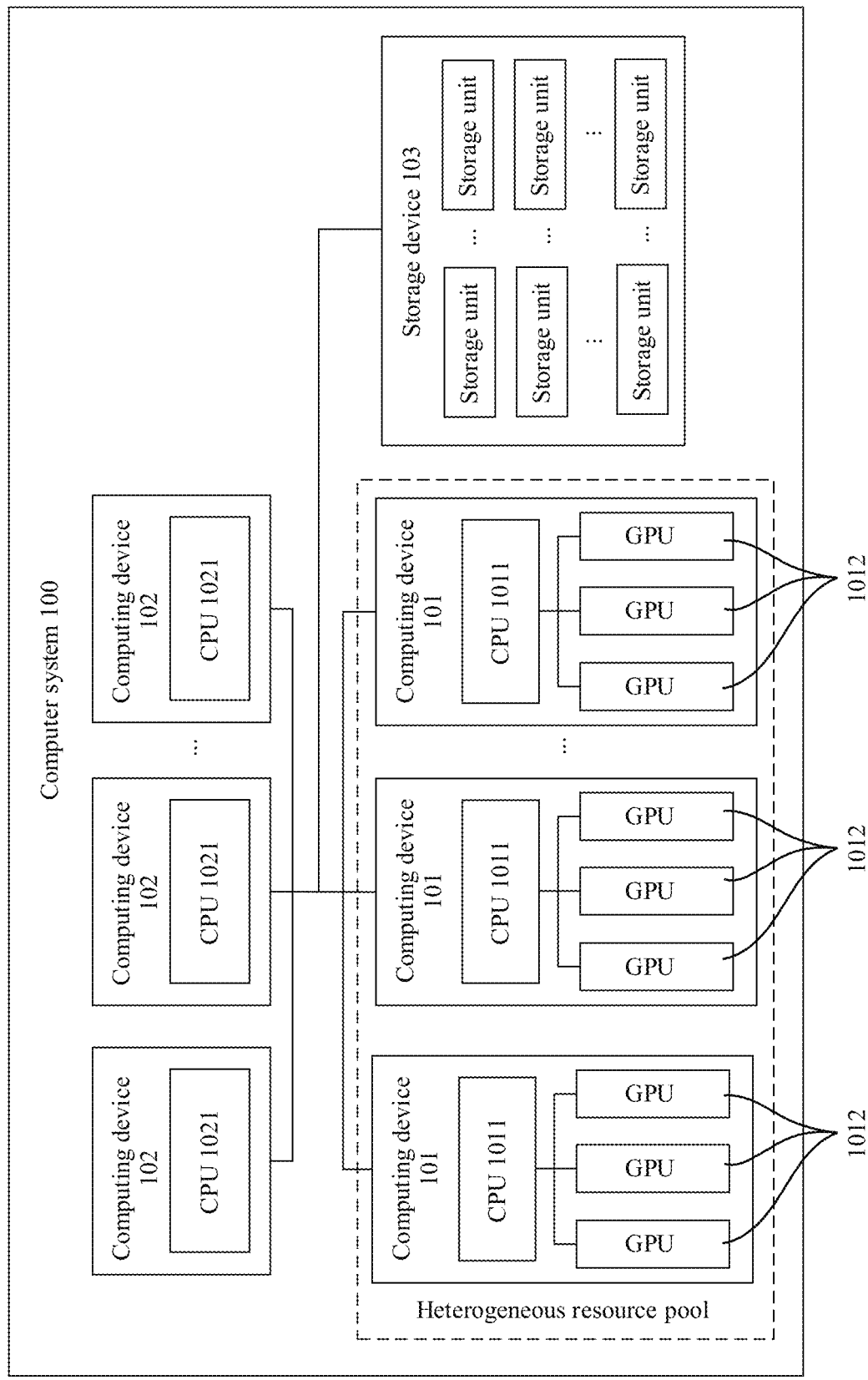
FIG. 1 is a schematic diagram of an architecture of a computer system 100 according to an embodiment of this disclosure.

FIG. 1 is a schematic diagram of an architecture of a computer system according to an embodiment of the present disclosure. As shown in FIG. 1, the computer system 100 includes at least one computing device 101, at least one computing device 102, and a storage device 103. The computing device 101 communicates with the computing device 102 through a network. The computing device 101 and the computing device 102 separately communicate with the storage device 103 through a network. The storage device 103 includes a plurality of storage units. The network includes device connection modes such as an Ethernet connection mode, an optical fiber connection mode, an Infiniband (IB) connection mode, and a wireless connection mode.

In this disclosure, the computing device 101 is configured to assist the computing device 102 in performing service processing. The computing device 102 may be a server, and a central processing unit (CPU) 1021 may be configured on the server. During specific implementation, the computing device 101 may also be a server. In addition to a CPU, at least one of a graphics processing unit (GPU), a field programmable gate array (FPGA), an application-specific integrated circuit (ASIC), or a neural network processing unit (NPU) may be further configured on the server. In this case, the server on which the CPU and at least one of the GPU, the FPGA, the ASIC, or the NPU are configured is referred to as a heterogeneous server, and a heterogeneous resource pool includes a plurality of heterogeneous servers. The GPU, the FPGA, the ASIC, or the NPU on the server is configured to assist a CPU 1011 in the computing device 102 in performing the service processing.

For ease of description, in the following description of this disclosure, a heterogeneous server that includes the GPU and that is in the computing device 101 is used as an example for description.

When assisting the computing device 102 in performing the service processing, the computing device 101 may configure a binding relationship between the computing device 101 and the computing device 102. In other words, one or more computing devices 101 may be selected from the heterogeneous resource pool to process and perform a service of a specified computing device 102. For a same computing device 101, a plurality of GPUs included in the computing device 101 may be configured to process only a service of a same computing device 102, or may process services of a plurality of computing devices 102. This is not limited in embodiments of this disclosure. When the binding relationship is established between the computing device 101 and a computing device 102, the computing device 101 has access permission of a storage unit that can be accessed by the computing device 102 bound to the computing device 101. For example, when the binding relationship is established between one computing device 101 and one computing device 102, the computing device 101 has access permission of a storage unit that can be accessed by the computing device 102.

Specifically, before assisting the computing device 102 in performing the service processing, the computing device 101 allocates, in the heterogeneous resource pool, a heterogeneous resource to the computing device 102. For example, the computing device 102 sends an initialization packet to a computing device 101 in the heterogeneous resource pool. The computing device 101 (hereinafter referred to as "a management computing device") is responsible for managing heterogeneous resources in the heterogeneous resource pool. The initialization packet is used to request the management computing device to allocate the heterogeneous resource to the computing device 102, and the initialization packet may carry a quantity of GPUs that the computing device 102 requests to allocate to the computing device 102.

The management computing device determines, based on the initialization packet and in the heterogeneous resource pool, to allocate GPUs that meet the quantity to the computing device 102. The management computing device disposes, in the computing device 101, a container for the GPUs allocated to the computing device 102, and feeds back an identifier of the container to the computing device 102. In this way, the binding relationship is established between the computing device 102 and the heterogeneous resources allocated to the computing device 102. The identifier of the container may be an ID of the container or an IP address of the container.

After the heterogeneous resource allocation is completed, an access permission that is the same as that of the computing device 102 further needs to be created on the storage device 103 for the container corresponding to the heterogeneous resources. After the access permission configuration is completed, the heterogeneous resources allocated to the computing device 102 have the access permission of the storage unit that can be accessed by the computing device 102 bound to the heterogeneous resources.

It should be noted that the foregoing merely uses an example in which there is only one management computing device in the heterogeneous resource pool for description, and this disclosure is not limited thereto. For example, any computing device 101 in the heterogeneous resource pool may be used as the foregoing management computing device. When requesting to allocate the heterogeneous resource to the computing device 102, the computing device 102 may send the initialization packet to any computing device 101 (that is, the management computing device) in the heterogeneous resource pool, and the management computing device allocates the heterogeneous resource to the computing device 102.

It should be further noted that the foregoing management manner of the heterogeneous resource pool does not constitute a limitation on the technical solutions of this disclosure. In addition to the foregoing management manner, the heterogeneous resource pool may be managed in another manner. For example, a computing device outside the heterogeneous resource pool manages computing devices in the heterogeneous resource pool.

Figure 2:
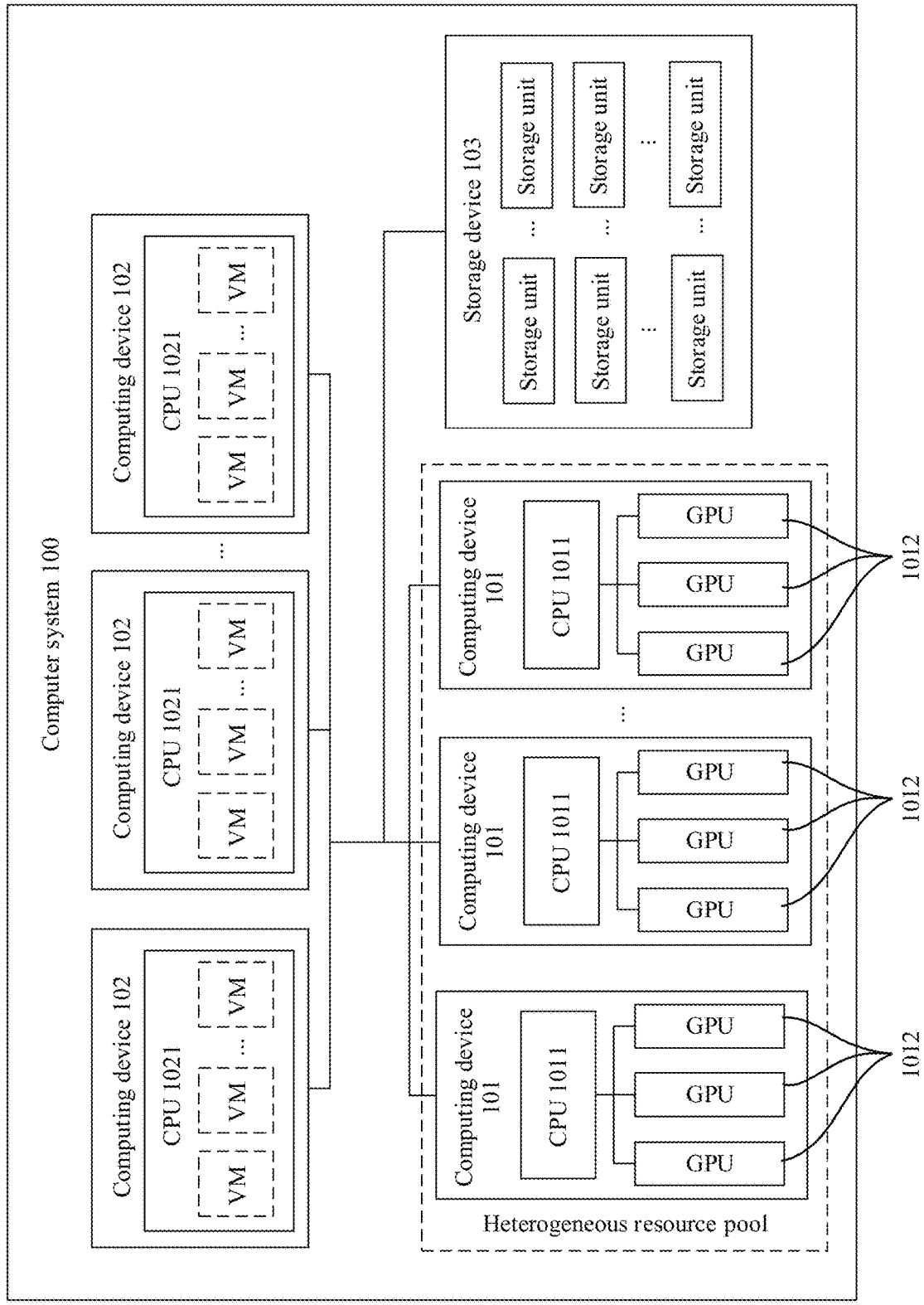
FIG. 2 is a schematic diagram of an architecture of another computer system 100 according to an embodiment of this disclosure.

FIG. 2 is a schematic diagram of an architecture of another computer system according to an embodiment of this disclosure. As shown in the figure, a computing device 102 may run one or more virtual machines (VM) on a CPU 1011. A plurality of VMs may run on one CPU 1021, or the plurality of VMs may be distributed in a plurality of CPUs 1021.

When assisting the computing device 102 in performing service processing, a computing device 101 may configure a binding relationship between the VM and the computing device 101. In other words, one or more computing devices 101 may be selected from a heterogeneous resource pool to process and perform a service of the VM. For a same computing device 101, a plurality of GPUs included in the computing device 101 may be configured to process only a service of a same VM, or may process services of a plurality of VMs. This is not limited in embodiments of this disclosure. When the binding relationship is established between the computing device 101 and a VM, the computing device 101 has access permission of a storage unit that can be accessed by the VM bound to the computing device 101. For example, when the binding relationship is established between a VM 1 and one computing device 101, the computing device 101 has access permission that is of a storage unit and that is of the VM 1.

It should be noted that when the computing device 101 assists the VM in the computing device 102 in performing the service processing, a heterogeneous resource also needs to be allocated, in the heterogeneous resource pool, to the VM, and an access permission that is the same as that of the VM needs to be created on a storage device 103 for the heterogeneous resource.

For a method for allocating, in the heterogeneous resource pool, the heterogeneous resource to the VM and creating, on the storage device 103, the access permission that is the same as that of the VM for the heterogeneous resource allocated to the VM, refer to the foregoing related descriptions. For brevity, details are not repeated.

The storage device 103 in this disclosure includes a file system storage device, a distributed file storage device, a block storage device, or an object storage device.

In an embodiment, in addition to a CPU, a computing device 102 may be further configured with at least one of a GPU, an FPGA, an ASIC, or an NPU (not shown in FIG. 1 and FIG. 2). In this case, a GPU resource in a heterogeneous resource pool may come from a computing device 101. One or more VMs may run on a CPU 1021 in the computing device 101. This is not specifically limited in embodiments of this disclosure.

It should be noted that quantities of CPUs and VMs in each computing device 102 in FIG. 1 and FIG. 2, quantities of processor cores included in each CPU, and quantities of CPUs and GPUs in the computing device 101 do not constitute a limitation on this disclosure.

Figure 3:
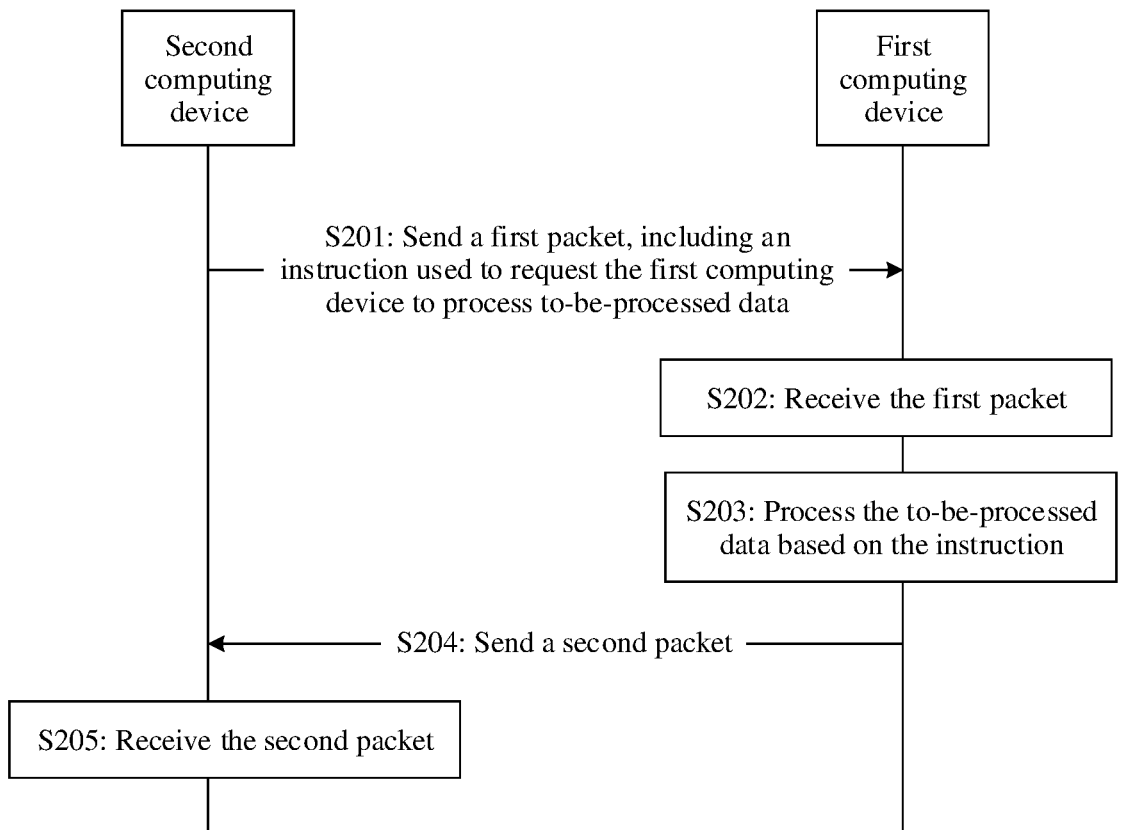
FIG. 3 is a schematic flowchart of a data processing method 200 according to an embodiment of this disclosure.

The following uses the computer system shown in FIG. 2 as an example to describe a data processing method 200 provided in this disclosure. FIG. 3 is a schematic flowchart of a data processing method according to this disclosure. For ease of description, in an example of this disclosure as shown in FIG. 2, the computing device 101 is a first computing device, the computing device 102 is a second computing device, the virtual machine runs on the computing device 102, and the computing device 101 assists the virtual machine in performing the service processing is used to describe the data processing method provided in this disclosure. As shown in the figure, the method 200 includes the following steps.

S201: A second computing device sends a first packet to a first computing device.

Specifically, when the second computing device (for example, the computing device 102 or the virtual machine running on the computing device 102) needs the first computing device (for example, the computing device 101) in a heterogeneous resource pool to assist in performing the service processing, the computing device 102 sends, to the computing device 101 that has a binding relationship with the computing device 102, a packet (for example, a first packet) for requesting the computing device 101 to assist in performing the service processing. The first packet includes an instruction used to request the computing device 102 to process to-be-processed data.

For example, when a VM running on the computing device 102 needs the computing device 101 in the heterogeneous resource pool to assist the VM in performing the service processing, the VM sends the first packet to a computing device 101 in which a GPU that is in the heterogeneous resource pool and that has the binding relationship with the VM is located. A CPU 1011 in the computing device 101 receives the first packet, and forwards the first packet to a GPU 1012 that is in the computing device 101 and that has the binding relationship with the VM. The GPU 1012 processes the to-be-processed data based on the instruction carried in the first packet.

S202: The first computing device receives the first packet sent by the second computing device.

S203: The first computing device processes to-be-processed data based on an instruction.

Specifically, the GPU 1012 in the computing device 101 processes the to-be-processed data based on the instruction carried in the received first packet.

First, a method for obtaining the to-be-processed data by the computing device 101 is described. The computing device 102 may determine, based on a type of the to-be-processed data, a manner of transmitting the to-be-processed data to the computing device 101. Alternatively, the computing device 102 may determine, based on a data volume of the to-be-processed data, a manner of transmitting the to-be-processed data to the computing device 101. Correspondingly, the computing device 101 may also obtain, in a similar manner, the to-be-processed data transmitted by the computing device 102. The following describes manners of obtaining the to-be-processed data by the computing device 101.

Manner 1: The first packet sent by the computing device 102 to the computing device 101 includes the to-be-processed data; and the computing device 101 parses the received first packet to obtain the to-be-processed data, and processes the to-be-processed data based on the instruction carried in the first packet.

Specifically, a CPU 1021 in the computing device 102 adds the to-be-processed data to the first packet based on the type of the to-be-processed data (for example, the to-be-processed data is a video bitstream data), and sends, to the CPU 1011 in the computing device 101, the first packet carrying the to-be-processed data. The CPU 1011 sends the first packet to the GPU 1012. Correspondingly, the CPU 1011 in the computing device 101 receives the first packet sent by the CPU 1021 in the computing device 102. The CPU 1011 sends the first packet to the GPU 1012, and the GPU 1012 parses the first packet to obtain the to-be-processed data.

When transmission of the to-be-processed data does not affect communication performance between the first computing device and the second computing device, the second computing device may directly send, to the first computing device, the first packet carrying the to-be-processed data. This reduces a communication latency between the first computing device and the second computing device.

Manner 2: The computing device 102 adds a first target address to the first packet, and the first target address is used to indicate a storage address of the to-be-processed data in a first storage resource, where the first storage resource is a storage resource for which the computing device 102 has access permission in a storage device 103; and the computing device 101 obtains the first target address from the first packet based on the received first packet, to obtain the to-be-processed data from storage space corresponding to the first target address in the first storage resource.

For example, a CPU 1021 in the computing device 102 stores, based on the type of the to-be-processed data (for example, the to-be-processed data is image data), the to-be-processed data in the storage space corresponding to the first target address in the first storage resource, and sends, to the CPU 1011 in the computing device 101, the first packet carrying the first target address. Correspondingly, the CPU 1011 in the computing device 101 receives the first packet, and the CPU 1011 sends the first packet to the GPU 1012. The GPU 1012 obtains the first target address carried in the first packet, and obtains the to-be-processed data from the storage space indicated by the first target address in the storage device 103.

Optionally, the computing device 102 may further determine, based on a comparison result between the data volume of the to-be-processed data and a preset first threshold, a manner of transmitting the to-be-processed data.

For example, the CPU 1021 in the computing device 102 may further compare the data volume of the to-be-processed data with the preset first threshold. When the data volume of the to-be-processed data (for example, the data volume of the to-be-processed data is 1.3 Gbyte (gigabyte)) is greater than or equal to the preset first threshold (for example, a value of the preset first threshold is 1 Gbyte), the CPU 1021 may transmit the to-be-processed data to the computing device 101 by using the method in the manner 2. Correspondingly, the GPU 1012 in the computing device 101 may obtain the to-be-processed data by using the method in the manner 2. Alternatively, when the data volume of the to-be-processed data (for example, the data volume of the to-be-processed data is 400 Kbyte (kilobyte)) is less than or equal to the preset first threshold (for example, a value of the preset first threshold is 1 Gbyte), the CPU 1021 of the computing device 102 may transmit the to-be-processed data to the computing device 101 by using the method in the manner 1. The computing device 101 may obtain the to-be-processed data by using the method in the manner 1.

When transmission of the to-be-processed data affects communication performance between the first computing device and the second computing device, the second computing device may store the to-be-processed data in storage space corresponding to a first target address in a first storage resource, and add the first target address to the first packet sent to the first computing device. In this way, the first computing device obtains the to-be-processed data from the storage space corresponding to the first target address in the first storage resource. This avoids direct sending of the to-be-processed data to the first computing device, thereby improving the communication performance between the first computing device and the second computing device.

After obtaining the to-be-processed data, the GPU 1012 in the computing device 101 processes the to-be-processed data based on the instruction carried in the first packet.

For example, the to-be-processed data is the image data, and processing corresponding to the instruction carried in the first packet is artificial intelligence (AI) processing. The AI processing is specifically to identify that an animal in an image is a cat or a dog.

Specifically, after the GPU 1012 in the computing device 101 performs the AI processing on the image data, an obtained result is that the animal in the image is the dog. The GPU 1012 in the computing device 101 needs to return the processing result of the image data (that is, a processing result of the to-be-processed data) to the computing device 102.

It should be noted that the value of the first threshold may be further adjusted based on network bandwidth and/or a network congestion degree between the computing device 101 and the computing device 102. For example, when network communication quality is comparatively high, the value of the first threshold may be set to 500 Kbyte.

It should be further noted that, when the to-be-processed data is video bitstream data, the first computing device 101 first needs to decode the video bitstream data to obtain image data corresponding to the video bitstream data when processing the video bitstream data. Then, the first computing device 101 processes the image data corresponding to the video bitstream data to obtain the processing result of the to-be-processed data corresponding to the video bitstream data.

S204: The first computing device sends a second packet to the first computing device.

S205: The second computing device receives the second packet sent by the first computing device.

Specifically, after obtaining the processing result of the to-be-processed data, the GPU 1012 in the computing device 101 returns the processing result of the to-be-processed data to the computing device 102.

The following describes methods for returning, by the computing device 101, the processing result of the to-be-processed data to the computing device 102.

Manner 3: The computing device 101 sends the second packet to the computing device 102, where the second packet carries the processing result of the to-be-processed data.

For example, when the to-be-processed data is the image data, the GPU 1012 in the computing device 101 adds the processing result of the to-be-processed data corresponding to the image data to the second packet, and sends the second packet to the CPU 1011 in the computing device 101. The CPU 1011 sends the second packet to the CPU 1021 in the computing device 102.

When transmission of the processing result of the to-be-processed data does not affect communication performance between the first computing device and the second computing device, the first computing device may directly send, to the second computing device, the second packet carrying the processing result of the to-be-processed data. This reduces a communication latency between the first computing device and the second computing device.

Manner 4: The computing device 101 stores the processing result of the to-be-processed data in storage space corresponding to a second target address in the first storage resource, and sends the second packet carrying the second target address to the computing device 102.

For example, when the to-be-processed data is the video bitstream data, the GPU 1012 in the computing device 101 stores the processing result of the to-be-processed data corresponding to the video bitstream data in the storage space corresponding to the second target address in the first storage resource, and sends the second packet carrying the second target address to the CPU 1011 in the computing device 101. The CPU 1011 sends the second packet to the CPU 1021 in the computing device 102. In this way, the CPU 1021 in the computing device 102 obtains, based on the second target address, the processing result of the to-be-processed data from the storage space corresponding to the second target address in the first storage resource.

Optionally, the computing device 101 may further determine, based on a comparison result between a data volume of the processing result of the to-be-processed data and a preset second threshold, a manner of transmitting the processing result of the to-be-processed data.

For example, the GPU 1012 in the computing device 101 may further compare a data volume of the processing result of the to-be-processed data with the preset second threshold. When the data volume of the processing result of the to-be-processed data (for example, the data volume of the processing result of the to-be-processed data is 0.6 Gbyte) is greater than or equal to the preset second threshold (for example, a value of the preset second threshold is 0.4 Gbyte), the GPU 1012 in the computing device 101 may return the processing result of the to-be-processed data to the computing device 102 by using the method in the manner 2 in the step S205. Alternatively, when the data volume of the processing result of the to-be-processed data (for example, the data volume of the processing result of the to-be-processed data is 600 Kbyte) is less than or equal to the preset second threshold (for example, a value of the preset second threshold is 1 Gbyte), the GPU 1012 in the computing device 101 may return the processing result of the to-be-processed data to the computing device 102 by using the method in the manner 1 in the step S205.

When transmission of the processing result of the to-be-processed data may affect communication performance between the first computing device and the second computing device, the first computing device may store the to-be-processed data in storage space corresponding to a second target address in the first storage resource, and add the second target address to the second packet sent to the second computing device. In this way, the second computing device obtains the processing result of the to-be-processed data from the storage space corresponding to the second target address in the first storage resource. This avoids direct sending of the processing result of the to-be-processed data to the second computing device, thereby improving the communication performance between the first computing device and the second computing device.

It should be noted that the second target address may alternatively be indicated by the computing device 102 to the computing device 101. In this case, the computing device 101 does not need to notify the computing device 102 of the second target address.

It should be further noted that, when the to-be-processed data is the video bitstream data, the processing result of the to-be-processed data that is returned by the computing device 101 to the computing device 102 should further include the image data corresponding to the video bitstream data obtained after the video bitstream data is decoded.

It should be noted that, when the processing result of the to-be-processed data is directly sent by the computing device 101 to the computing device 102, the processing result of the to-be-processed data may be directly sent by the GPU 1012 in the computing device 101 to the CPU 1011 in the computing device 101 in a remote direct memory access (RDMA) manner without passing through the CPU 1011 in the computing device 101. In an example embodiment, the GPU 1012 may be a chip that supports an RDMA function. In this case, the GPU 1012 may directly store the processing result of the to-be-processed data in a memory of the computing device 102. A specific process in which the GPU 1012 transmits the data in the RDMA manner is not limited in embodiments of this disclosure.

When the to-be-processed data is directly sent by the computing device 102 to the computing device 101, the to-be-processed data may be directly sent by the CPU 1021 in the computing device 102 to the GPU 1012 in the computing device 101 in the RDMA manner without passing through the CPU 1011 in the computing device 101.

It should be further noted that, in this disclosure, the manner 1 and the manner 2 in the step S203 and the manner 1 and the manner 2 in the step S205 are merely examples for description, and do not constitute any limitation on embodiments of this disclosure. For example, the foregoing four manners may be randomly combined to be corresponding to the following four combination forms. In specific use, an actual application scenario may be considered for selection.

Scenario 1: When the data volume of the to-be-processed data is greater than or equal to the preset first threshold, and the processing result of the to-be-processed data is greater than or equal to the preset second threshold, the computing device 102 transmits the to-be-processed data to the computing device 101 in the manner 2; and after obtaining the processing result of the to-be-processed data, the computing device 101 returns the processing result of the to-be-processed data to the computing device 102 in the manner 4.

Scenario 2: When the data volume of the to-be-processed data is less than or equal to the preset first threshold, and the processing result of the to-be-processed data is greater than or equal to the preset second threshold, the computing device 102 transmits the to-be-processed data to the computing device 101 in the manner 1; and after obtaining the processing result of the to-be-processed data, the computing device 101 returns the processing result of the processed data to the computing device 102 in the manner 4.

Scenario 3: When the data volume of the to-be-processed data is greater than or equal to the preset first threshold, and the processing result of the to-be-processed data is less than or equal to the preset second threshold, the computing device 102 transmits the to-be-processed data to the computing device 101 in the manner 2; and after obtaining the processing result of the to-be-processed data, the computing device 101 returns the processing result of the processed data to the computing device 102 in the manner 3.

Scenario 4: When the data volume of the to-be-processed data is less than or equal to the preset first threshold, and the processing result of the to-be-processed data is less than or equal to the preset second threshold, the computing device 102 transmits the to-be-processed data to the computing device 101 in the manner 1; and after obtaining the processing result of the to-be-processed data, the computing device 101 returns the processing result of the processed data to the computing device 102 in the manner 3.

In the data processing method provided in this disclosure, the heterogeneous resource pool includes a plurality of computing devices (for example, a plurality of first computing devices), so that when a plurality of second computing devices simultaneously need heterogeneous resources to assist the plurality of second computing devices in performing service requests, demands of the plurality of second computing devices requesting to be assisted in performing the service requests may be distributed in the heterogeneous resource pool. In this case, the plurality of first computing devices in the heterogeneous resource pool can assist the plurality of second computing devices in performing the corresponding service requests. Therefore, network traffic generated during communication between the second computing device and the heterogeneous resource is distributed in the heterogeneous resource pool, so that communication performance between the second computing device and the heterogeneous resource is improved.

The foregoing describes the data processing method provided in this disclosure with reference to FIG. 1 to FIG. 3. The following describes a data processing apparatus and a computing device provided in the embodiments of this disclosure with reference to FIG. 4 to FIG. 6.

Figure 4:
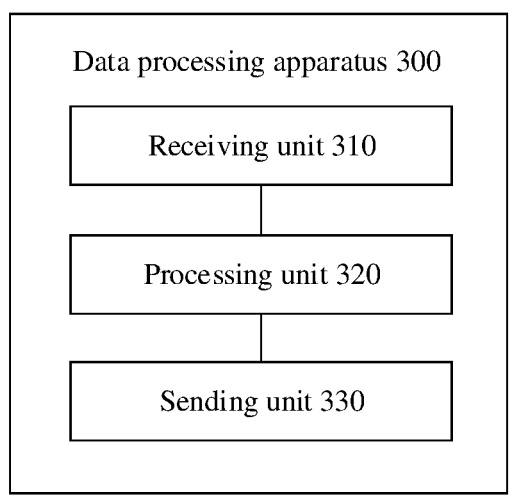
FIG. 4 is a schematic structural diagram of a data processing apparatus 300 according to an embodiment of this disclosure.

FIG. 4 is a schematic block diagram of a data processing apparatus 300 according to an embodiment of this disclosure. The apparatus 300 includes a receiving unit 310, a processing unit 320, and a sending unit 330.

The receiving unit 310 is configured to receive a first packet sent by a second computing device, and the data processing apparatus communicates with the second computing device through a network. The apparatus 300 is configured to assist the second computing device in performing service processing, and the apparatus 300 is a computing device in a heterogeneous resource pool, where the heterogeneous resource pool includes at least one data processing apparatus. The first packet includes an instruction used to request the data processing apparatus to process to-be-processed data.

The processing unit 320 is configured to process the to-be-processed data based on the instruction.

The sending unit 330 is configured to send a second packet to the second computing device, where the second packet includes a processing result of the to-be-processed data.

Optionally, the first packet includes the to-be-processed data, and the processing unit 320 is further configured to: parse the first packet to obtain the to-be-processed data, and process the to-be-processed data based on the instruction.

Optionally, a first storage resource is configured for the second computing device, and the data processing apparatus has access permission of the first storage resource. The first packet carries a first target address, and the first target address is used to indicate a storage address of the to-be-processed data in the first storage resource. The processing unit 320 is further configured to: obtain the to-be-processed data from the first storage resource based on the first target address, and process the to-be-processed data based on the instruction.

Optionally, the processing unit 320 is further configured to store the processing result of the to-be-processed data to a second target address, where the second target address is a storage address of the first storage resource. The second packet sent by the data processing apparatus to the second computing device includes the second target address. In this way, the second computing device obtains the processing result of the to-be-processed data from the first storage resource based on the second target address.

Optionally, the sending unit 330 is further configured to send the second packet carrying data of the processing result to the second computing device.

Optionally, the to-be-processed data is transmitted by the second computing device to the data processing apparatus by using a remote direct memory access RDMA technology.

Optionally, the processing result of the to-be-processed data is transmitted by the data processing apparatus to the second computing device by using the RDMA technology.

Optionally, the to-be-processed data is video bitstream data, and the processing unit is further configured to: decode the video bitstream data, to obtain image data corresponding to the video bitstream data, and process, based on the instruction, the image data corresponding to the video bitstream data. The processing result of the to-be-processed data includes the image data corresponding to the video bitstream data.

Optionally, a storage device configured with the first storage resource includes a file system storage device, a distributed file system storage device, a block storage device, or an object storage device.

Optionally, processing corresponding to the instruction includes artificial intelligence (AI) processing.

It should be understood that the apparatus 300 in this embodiment may be implemented through an application-specific integrated circuit (ASIC), or may be implemented through a programmable logic device (PLD). The PLD may be a complex programmable logic device (CPLD), a field programmable gate array (FPGA), generic array logic (GAL), or any combination thereof. Alternatively, when the data processing method shown in FIG. 3 is implemented by software, the apparatus 300 and modules of the apparatus 300 may be software modules.

The apparatus 300 in this disclosure may correspondingly perform the method described in the embodiments of this disclosure, and the foregoing and other operations and/or functions of the modules of the apparatus 300 are intended to implement a corresponding procedure executed by the first computing device in the method shown in FIG. 3. For brevity, details are not repeated.

Figure 5:
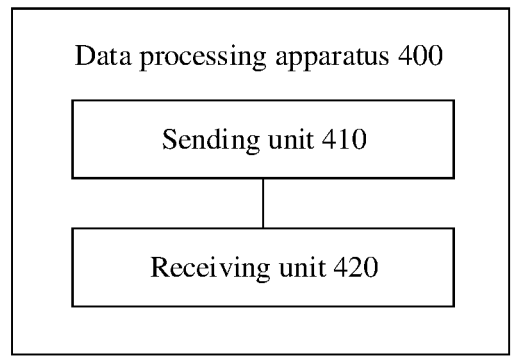
FIG. 5 is a schematic structural diagram of a data processing apparatus 400 according to an embodiment of this disclosure.

FIG. 5 is a schematic block diagram of a data processing apparatus 400 according to an embodiment this disclosure. The apparatus 400 includes a sending unit 410 and a receiving unit 420.

The sending unit 410 is configured to send a first packet to a first computing device, and the first computing device communicates with the data processing apparatus through a network. The first computing device is configured to assist the apparatus 400 in performing service processing, and the first computing device is a computing device in a heterogeneous resource pool, where the heterogeneous resource pool includes at least one first computing device. The first packet includes an instruction used to request the first computing device to process to-be-processed data.

The receiving unit 420 is configured to receive a second packet sent by the first computing device, where the second packet includes a processing result of the to-be-processed data.

Optionally, the first packet includes the to-be-processed data.

Optionally, a first storage resource is configured for the data processing apparatus 400, and the first computing device has access permission of the first storage resource. The first packet carries a first target address, and the first target address is used to indicate a storage address of the to-be-processed data in the first storage resource.

Optionally, the second packet includes a second target address, and the data processing apparatus obtains the processing result of the to-be-processed data from the first storage resource based on the second target address.

Optionally, the receiving unit 420 is further configured to receive the second packet that is sent by the first computing device and that carries data of the processing result.

Optionally, the to-be-processed data is transmitted by the data processing apparatus to the first computing device in a remote direct memory access (RDMA) manner.

Optionally, the processing result of the to-be-processed data is transmitted by the first computing device to the data processing apparatus in the (RDMA) manner.

Optionally, the processing result of the to-be-processed data includes image data corresponding to video bitstream data.

Optionally, a storage device configured with the first storage resource includes a file system storage device, a distributed file system storage device, a block storage device, or an object storage device.

Optionally, processing corresponding to the instruction includes artificial intelligence (AI) processing.

It should be understood that the apparatus 400 in this embodiment may be implemented through an application-specific integrated circuit (ASIC), or may be implemented through a programmable logic device (PLD). The PLD may be a complex programmable logic device (CPLD), a field programmable gate array (FPGA), generic array logic (GAL), or any combination thereof. Alternatively, when the data processing method shown in FIG. 3 is implemented by software, the apparatus 400 and modules of the apparatus 300 may be software modules.

The apparatus 400 in this disclosure may correspondingly perform the method described in the embodiments of this disclosure, and the foregoing and other operations and/or functions of the modules of the apparatus 400 are intended to implement a corresponding procedure executed by the second computing device in the method shown in FIG. 3. For brevity, details are not repeated.

Figure 6:
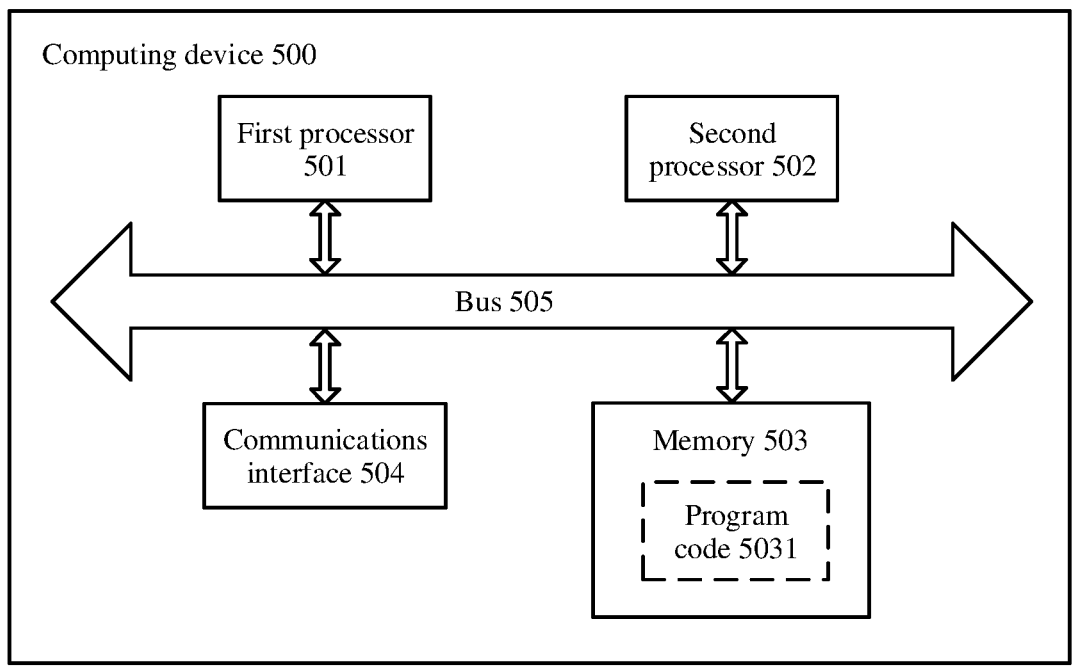
FIG. 6 is a schematic structural diagram of a computing device 500 according to an embodiment of this disclosure.

FIG. 6 is a schematic structural diagram of a computing device according to an embodiment of this disclosure. As shown in the figure, the computing device 500 includes a first processor 501, a second processor 502, a memory 503, a communications interface 504, and a bus 505. The first processor 501, the second processor 502, the memory 503, and the communications interface 504 communicate with each other through the bus 505, or may communicate with each other in another manner such as wireless transmission. The memory 503 is configured to store one or more instructions, and the first processor 501 is configured to execute the one or more instructions stored in the memory 503. The memory 503 stores program code 5031, and the first processor 501 may invoke the program code 5031 stored in the memory 702 to perform the data processing method in FIG. 3.

It should be understood that in this disclosure, the first processor 501 may be a CPU, or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or any conventional processor, or the like.

The second processor 502 includes at least one of a GPU, an FPGA, an ASIC, or an NPU. The second processor is mainly configured to execute a task of assisting another computing device in performing processing. For example, the second processor may assist the another computing device in processing video bitstream data.

The memory 503 may include a read-only memory and a random access memory, and provide one or more instructions and data to the first processor 501. The memory 503 may further include a non-volatile random access memory. The memory 503 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

In addition to a data bus, the bus 505 may further include a power bus, a control bus, a status signal bus, and the like. However, for clear description, various types of buses in the figure are marked as the bus 505.

It should be noted that the computing device 500 may be corresponding to the computing device 101 in the computing system shown in FIG. 1 or FIG. 2. When the computing device 500 is corresponding to the computing device 102 in the computing system shown in FIG. 1 or FIG. 2, the second processor 502 may be used as an optional component, and the computing device 102 may include the second processor 502, or may not include the second processor 502.

It should be understood that the computing device 500 according to this disclosure may be corresponding to the data processing apparatus 300 or the data processing apparatus 400 in this disclosure, and may be corresponding to the first computing device or the second computing device in the method shown in FIG. 3. In addition, when the computing device 500 is corresponding to the first computing device in the method shown in FIG. 3, the foregoing and other operations and/or functions of the modules in the computing device 500 are used to implement operation steps of the method performed by the first computing device in FIG. 3. When the computing device 500 is corresponding to the second computing device in the method shown in FIG. 3, the foregoing and other operations and/or functions of the modules in the computing device 500 are used to implement operation steps of the method performed by the second computing device in FIG. 3. For brevity, details are not repeated.

This disclosure further provides a computer system. The computer system may be the computer system shown in FIG. 1 or FIG. 2. The computer system includes at least two computing devices, and one of the computing devices may be the computing device 101 shown in FIG. 1 or FIG. 2. The computing device is configured to perform operation steps of the method performed by the first computing device in the foregoing method 200. Another computing device may be the computing device 102 shown in FIG. 1 or FIG. 2. The computing device is configured to perform operation steps of the method performed by the second computing device in the foregoing method 200. For brevity, details are not repeated.

All or some of the foregoing embodiments may be implemented through software, hardware, firmware, or any combination thereof. When the software is used to implement the embodiments, all or some of the foregoing embodiments may be implemented in a form of a computer program product. The computer program product includes one or more computer instructions. When one or more computer program instructions are loaded and executed on the computer, the procedures or functions according to the embodiments of this disclosure are all or partially generated. The computer may be a general-purpose computer, a special-purpose computer, a computer network, or another programmable apparatus. The computer instruction(s) may be stored in a computer-readable storage medium or may be transmitted from one computer-readable storage medium to another computer-readable storage medium. For example, the computer instruction(s) may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiment, and details are not repeated.

In the several embodiments provided in this disclosure, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

The foregoing descriptions are merely non-limiting examples of specific implementations, but are not intended to limit the protection scope, which is intended to cover any variation or replacement readily determined by a person of ordinary skill in the art. Therefore, the claims shall define the protection scope.

What is claimed is:

1. A data processing method, comprising:
receiving, by a first computing device, a first packet sent by a second computing device that has a binding relationship with the first computing device, wherein
the first computing device communicates with the second computing device through a network,
the first computing device is configured to assist the second computing device in performing service processing,
the first computing device is in a heterogeneous resource pool including at least one computing device,
the first computing device comprises a central processing unit (CPU) and an assisting processing unit configured to assist a CPU in the second computing device in performing the service processing and comprising a graphics processing unit (GPU), a field programmable gate array (FPGA), an application-specific integrated circuit (ASIC), or a neural network processing unit (NPU),
the second computing device sends the first packet to the first computing device according to the binding relationship, and
the first packet comprises an instruction requesting the bounded first computing device to process to-be-processed data;
processing, by the assisting processing unit of the first computing device, the to-be-processed data based on the instruction; and
sending, by the first computing device, a second packet to the second computing device, wherein the second packet comprises a processing result of the to-be-processed data.

2. The method of claim 1, wherein the first packet comprises the to-be-processed data, and the processing, by the first computing device, the to-be-processed data based on the instruction comprises:
parsing, by the first computing device, the first packet to obtain the to-be-processed data; and processing, by the first computing device, the to-be-processed data based on the instruction.

3. The method of claim 1, wherein the second computing device is configured with a first storage resource; the first computing device has access permission of the first storage resource; the first packet carries a first target address that is indicative of a storage address of the to-be-processed data in the first storage resource; and the processing, by the first computing device, the to-be-processed data based on the instruction comprises:
  obtaining, by the first computing device, the to-be-processed data from the first storage resource based on the first target address; and
  processing, by the first computing device, the to-be-processed data based on the instruction.

4. The method of claim 1, further comprising: before sending the second packet to the second computing device,
  storing, by the first computing device, the processing result of the to-be-processed data to a second target address that is a storage address of a first storage resource; and
  the sending, by the first computing device, a second packet to the second computing device comprises:
  sending, by the first computing device to the second computing device, the second packet carrying the second target address, to enable the second computing device to obtain the processing result of the to-be-processed data from the first storage resource based on the second target address.

5. The method of claim 1, wherein the sending, by the first computing device, a second packet to the second computing device comprises:
  sending, by the first computing device to the second computing device, the second packet carrying data of the processing result.

6. The method of claim 2, wherein the to-be-processed data is transmitted by the second computing device to the first computing device in a remote direct memory access (RDMA) manner.

7. The method of claim 5, wherein the processing result of the to-be-processed data is transmitted by the first computing device to the second computing device in a remote direct memory access (RDMA) manner.

8. The method of claim 1, wherein the processing result of the to-be-processed data comprises image data corresponding to video bitstream data.

9. The method of claim 4, wherein a storage device configured with the first storage resource comprises a file system storage device, a distributed file system storage device, a block storage device, or an object storage device.

10. The method of claim 1, wherein the processing of the to-be-processed data based on the instruction comprises artificial intelligence (AI) processing.

11. A computing device, comprising at least one processor including a central processing unit (CPU) and an assisting processing unit, and a memory; the memory is configured to store one or more computer program instructions that, when executed by the at least one processor, cause the computing device to perform operations comprising:
  receiving a first packet sent by a second computing device that has a binding relationship with the computing device, wherein
    the computing device communicates with the second computing device through a network,
    the computing device is configured to assist the second computing device in performing service processing,
    the computing device is in a heterogeneous resource pool including at least one computing device,
    the assisting processing unit of the computing device is configured to assist a CPU in the second computing device in performing the service processing and comprises a graphics processing unit (GPU), a field programmable gate array (FPGA), an application-specific integrated circuit (ASIC), or a neutral network processing unit (NPU),
    the second computing device sends the first packet to the computing device according to the binding relationship, and
    the first packet comprises an instruction requesting the bounded computing device to process to-be-processed data;
  processing, using the assisting processing unit, the to-be-processed data based on the instruction; and
  sending a second packet to the second computing device, wherein the second packet comprises a processing result of the to-be-processed data.

12. The computing device of claim 11, wherein the operations further comprise:
  parsing the first packet to obtain the to-be-processed data.

13. The computing device of claim 11, wherein the second computing device is configured with a first storage resource; the computing device has access permission of the first storage resource; the first packet carries a first target address that is indicative of a storage address of the to-be-processed data in the first storage resource; and the operations further comprise:
  obtaining the to-be-processed data from the first storage resource based on the first target address; and
  processing the to-be-processed data based on the instruction.

14. The computing device of claim 11, wherein the operations further comprise:
  storing the processing result of the to-be-processed data to a second target address that is a storage address of a first storage resource; and
  sending the second packet carrying the second target address, to enable the second computing device to obtain the processing result of the to-be-processed data from the first storage resource based on the second target address.

15. The computing device of claim 12, the operations further comprise:
  sending the second packet carrying data of the processing result.

16. The computing device of claim 12, wherein the to-be-processed data is transmitted by the second computing device to the computing device in a remote direct memory access (RDMA) manner.

17. The computing device of claim 15, wherein the processing result of the to-be-processed data is transmitted by the computing device to the second computing device in an RDMA manner.

18. The computing device of claim 11, wherein the processing result of the to-be-processed data comprises image data corresponding to video bitstream data.

19. The computing device of claim 14, wherein a storage device configured with the first storage resource comprises a file system storage device, a distributed file system storage device, a block storage device, or an object storage device.

20. A non-transitory computer-readable storage medium comprising instructions that, when executed by a first computing device, cause the first computing device to perform operations comprising:

receiving a first packet sent by a second computing device that has a binding relationship with the first computing device, wherein
- the first computing device communicates with the second computing device through a network,
- the first computing device is configured to assist the second computing device in performing service processing,
- the first computing device is in a heterogeneous resource pool including at least one computing device,
- the first computing device comprises a central processing unit (CPU) and an assisting processing unit configured to assist a CPU in the second computing device in performing the service processing and comprising a graphics processing unit (GPU) a field programmable gate array (FPGA), an application-specific integrated circuit (ASIC), or a neural network processing unit (NPU),
- the second computing device sends the first packet to the first computing device according to the binding relationship, and
- the first packet comprises an instruction requesting the bounded first computing device to process to-be-processed data;

processing the to-be-processed data based on the instruction using the assisting processing unit; and sending a second packet to the second computing device, wherein the second packet comprises a processing result of the to-be-processed data.

* * * * *

UNITED STATES PATENT AND TRADEMARK OFFICE
CERTIFICATE OF CORRECTION

PATENT NO. : 12,124,886 B2
APPLICATION NO. : 17/232195
DATED : October 22, 2024
INVENTOR(S) : Xiaoke Ni Page 1 of 1

It is certified that error appears in the above-identified patent and that said Letters Patent is hereby corrected as shown below:

In the Claims

Column 22, Claim 11, Line 8, change "neutral" to --neural--.

Signed and Sealed this
Nineteenth Day of November, 2024

Katherine Kelly Vidal
*Director of the United States Patent and Trademark Office*